US012714625B2

(12) United States Patent
Johnson et al.

(10) Patent No.: US 12,714,625 B2
(45) Date of Patent: Aug. 25, 2026

(54) SPINAL DECOMPRESSION SYSTEM

(71) Applicants: Scot Leslie Johnson, Tampa, FL (US); Saleem Najeeb Musallam, Tampa, FL (US)

(72) Inventors: Scot Leslie Johnson, Tampa, FL (US); Saleem Najeeb Musallam, Tampa, FL (US)

( * ) Notice: Subject to any disclaimer, the term of this patent is extended or adjusted under 35 U.S.C. 154(b) by 231 days.

(21) Appl. No.: 17/182,196

(22) Filed: Feb. 22, 2021

(65) Prior Publication Data

US 2021/0259901 A1 Aug. 26, 2021

Related U.S. Application Data

(60) Provisional application No. 62/978,937, filed on Feb. 20, 2020.

(51) Int. Cl.
*A61H 1/02* (2006.01)

(52) U.S. Cl.
CPC ... *A61H 1/0229* (2013.01); *A61H 2201/0192* (2013.01); *A61H 2201/1207* (2013.01);
(Continued)

(58) Field of Classification Search
CPC .......... A61H 1/0229; A61H 2201/0192; A61H 2201/1207; A61H 2201/163; A61H 2201/164; A61H 2201/1664; A61H 2201/1671; A61H 2201/5002; A61H 2201/5007; A61H 2203/0456; A61H 1/006; A61H 1/008; A61H 1/02; A61H 1/0214; A61H 1/0218; A61H 1/0222; A61H 1/0292; A61H 1/0296; A61H 2201/0142; A61H 2201/018; A61H 2201/1215; A61H 2201/123; A61H 2201/1619; A61H 2201/1621; A61H 2201/165; A61H 2201/1652; A61H 2201/1669;
(Continued)

(56) References Cited

U.S. PATENT DOCUMENTS 6,152,950 A * 11/2000 Shealy ................ A61H 1/0222 606/241
2005/0010152 A1* 1/2005 Becerra ............... A61H 1/0222 602/33

(Continued)

OTHER PUBLICATIONS

North American Medical Corporation, "Accu-Spina Operator's Manual," 2010. (Year: 2010).*

(Continued)

*Primary Examiner* — Douglas Y Sul
(74) *Attorney, Agent, or Firm* — The Emanuelson Firm, P.C.; Kenneth Thomas Emanuelson

(57) ABSTRACT

An apparatus for decompressive therapy applied to the human spine. The apparatus incorporates a decompression actuator or motor connected to an attachment point on a pelvic harness, which is in turn applied to the lumbar region of a patient. The decompression motor may be raised or lowered in order to orient the pelvic harness about the lumbar spine, thereby aligning certain of the lumbar vertebra and intervertebral discs. The decompression motor applies cyclical decompressive forces to the aligned spine, providing enhanced lumbar decompression.

18 Claims, 13 Drawing Sheets

(52) U.S. Cl.
CPC .. *A61H 2201/163* (2013.01); *A61H 2201/164* (2013.01); *A61H 2201/1664* (2013.01); *A61H 2201/1671* (2013.01); *A61H 2201/5002* (2013.01); *A61H 2201/5007* (2013.01); *A61H 2203/0456* (2013.01)

(58) Field of Classification Search
CPC .... A61H 2201/5061; A61H 2201/5069; A61H 2205/081; A61H 1/00; A61H 2203/0443
USPC .......................................................... 601/26
See application file for complete search history.

(56) References Cited

U.S. PATENT DOCUMENTS

| | | | | |
|---|---|---|---|---|
| 2005/0192517 | A1* | 9/2005 | Becerra | A61H 1/0222 601/1 |
| 2006/0015145 | A1* | 1/2006 | Smith | A61F 5/04 606/237 |
| 2006/0142683 | A1* | 6/2006 | Johnson | A61H 1/0222 602/32 |
| 2006/0287619 | A1* | 12/2006 | Becerra | A61H 1/0222 601/84 |
| 2006/0287627 | A1* | 12/2006 | Johnson | A61H 1/0292 602/33 |
| 2007/0027422 | A1* | 2/2007 | Becerra | A61H 1/0296 602/33 |
| 2007/0106192 | A1* | 5/2007 | Johnson | A61H 1/0222 602/2 |
| 2008/0188780 | A1* | 8/2008 | Becerra | A61H 23/0254 602/33 |
| 2009/0299247 | A1* | 12/2009 | Becerra | A61H 1/0292 602/32 |
| 2014/0364910 | A1* | 12/2014 | Ren | A61H 1/0222 606/242 |
| 2021/0052456 | A1* | 2/2021 | Tu | A61H 1/0222 |

OTHER PUBLICATIONS

Agency for Healthcare Research and Quality, "Decompression Therapy for the Treatment of Lumbosacral Pain," Apr. 26, 2007. (Year: 2007).*

Accu-SPINA® Operator's Manual, 62 pages, 2010, North American Medical Corporation, Marietta GA.†

* cited by examiner
† cited by third party

SPINAL DECOMPRESSION SYSTEM

FIELD OF THE DISCLOSURE

The present disclosure relates to an apparatus and method for spinal therapy, and in particular to therapy for the lumbar portion of the human spinal column.

BACKGROUND TO THE DISCLOSURE

There are a variety of conditions which lead to back pain, including but not limited to spinal disc herniation and degeneration. Restoration of the function of the intervertebral disc(s) through physical therapy, including traction and decompression, is known to promote healing of the spine and normal spinal function with regards to day-to-day function and quality of life.

In the case of traction, a distractive force may be applied to the spine to reduce intervertebral disc compressive force (s) and allow for a period of unloading for the intervertebral discs to heal. Typically, the human patient is placed supine on a treatment bed. The most basic form of lumbar traction or decompression therapy relies on "manual" manipulation of the lumbar spine. According to this method, the healthcare provider typically grabs the patient by the ankles or lower legs, then pulls the ankles or lower legs in an attempt to provide traction.

In addition to manual methods, various mechanical apparatuses have been developed to aid in either traction or decompression therapy. One simple, basic method of spinal traction involves the use of 'traction boots'. In one type of such device, a bar is secured between two stable posts, such as a door frame. The patient then applies the traction boots, a wrap or boot that is applied firmly about the ankles and/or feet, the boots having some form of hook. The patient then contorts themselves such that the hooks of the boot are hanging on the bar, the patient then suspended by the boots on the bar and gravity provides the traction force on the spine.

In another embodiment, an A-frame structure containing a hinge or bearings at its apex upon which a bed or platform is attached forms the apparatus. The patient attaches the aforementioned 'traction boots' to themselves. The patient then rotates the platform to the standing position, stands upon the platform and aligns the hooks of the traction boots to a bar located at the base of the platform such that the hooks of the traction boots are upon the platform's bar. Then, the patient physically rotates the platform upon which they lay backwards, such that their head is at least partially below their body, gravity providing the force which unloads their spinal segments.

An additional apparatus by which traction and basic decompression of the lumbar spine may be accomplished is through the use of a manually configurable or automated bed upon which a patient lay prone. The patient is positioned such that the lowest mattress can pivot up or down, the upward limit being parallel to the floor upon which the overall device is mounted. The healthcare provider will lay the patient on the apparatus such that the intervertebral disc location to be treated is located relative to the pivot point. In one method, the healthcare provider can apply manual pressure upon the lumbar spine to decompress the intervertebral disc(s) to be treated. In another aspect, the pivot point of the lowest mattress may be rotated downwards and upwards, in a way to apply a limited decompression of the lumbar spine.

SUMMARY OF THE DISCLOSURE

The subject matter presented herein provides a new and effective apparatus and method for providing spinal therapy to patients suffering from back pain, particularly in the lumbar region. The apparatus and method of the present disclosure allows for varying decompressive force to be applied to the spine over time, according to optimized therapy patterns. The apparatus and method also allows for decompressive force to be applied from a variety of angles, in order to target and focus the therapeutic decompressive force.

In one embodiment of the present disclosure, a pelvic harness is applied to a patient. The patient then lies supine on a treatment bed. A decompression actuator or motor is connected to an attachment point on the pelvic harness. The decompression motor may be raised or lowered in order to orient the pelvic harness about the lumbar spine, thereby aligning certain of the lumbar vertebra and intervertebral discs. The decompression motor then applies cyclical decompressive forces to the aligned spine, providing true lumbar decompression.

Various objects, features, aspects and advantages of the inventive subject matter will become more apparent from the following detailed description of illustrative embodiments, along with the accompanying drawing figures in which like numerals represent like components.

BRIEF DESCRIPTION OF THE DRAWINGS

The foregoing disclosure will be best understood, and the advantages thereof made most clearly apparent, when consideration is given to the following detailed description in combination with the drawing figures presented. The detailed description makes reference to the following drawings.

DETAILED DESCRIPTION OF THE DRAWINGS

The following detailed description provides certain specific embodiments of the subject matter disclosed herein. Although each embodiment represents a single combination of elements, the subject matter disclosed herein should be understood to include sub-combinations of the disclosed elements. Thus, if one embodiment comprises elements A, B, and C, and a second embodiment comprises elements B and D, then the inventive subject matter is also intended to include other remaining combinations of A, B, C, or D, even if not explicitly disclosed herein.

The subject matter presented herein provides a new and effective apparatus and method for providing spinal therapy to patients suffering from back pain, particularly in the lumbar region. The apparatus and method of the present disclosure allows for varying decompressive force to be applied to the spine over time, according to optimized therapy patterns. The apparatus and method also allows for decompressive force to be applied from a variety of angles, in order to target and focus the therapeutic decompressive force.

In one embodiment of the present disclosure, a pelvic harness is applied to a patient. The patient then lies supine on a treatment bed. A decompression actuator or motor is connected, directly or indirectly, to an attachment point on the pelvic harness. According to certain embodiments, the decompression motor may be raised or lowered in order to orient the pelvic harness about the lumbar spine, thereby aligning certain of the lumbar vertebra and intervertebral discs. The decompression motor then applies cyclical decompressive forces to the aligned spine, providing true lumbar decompression. The operation of these elements is described in further detail below, in connection with the associated drawing figures.

Figure 1:
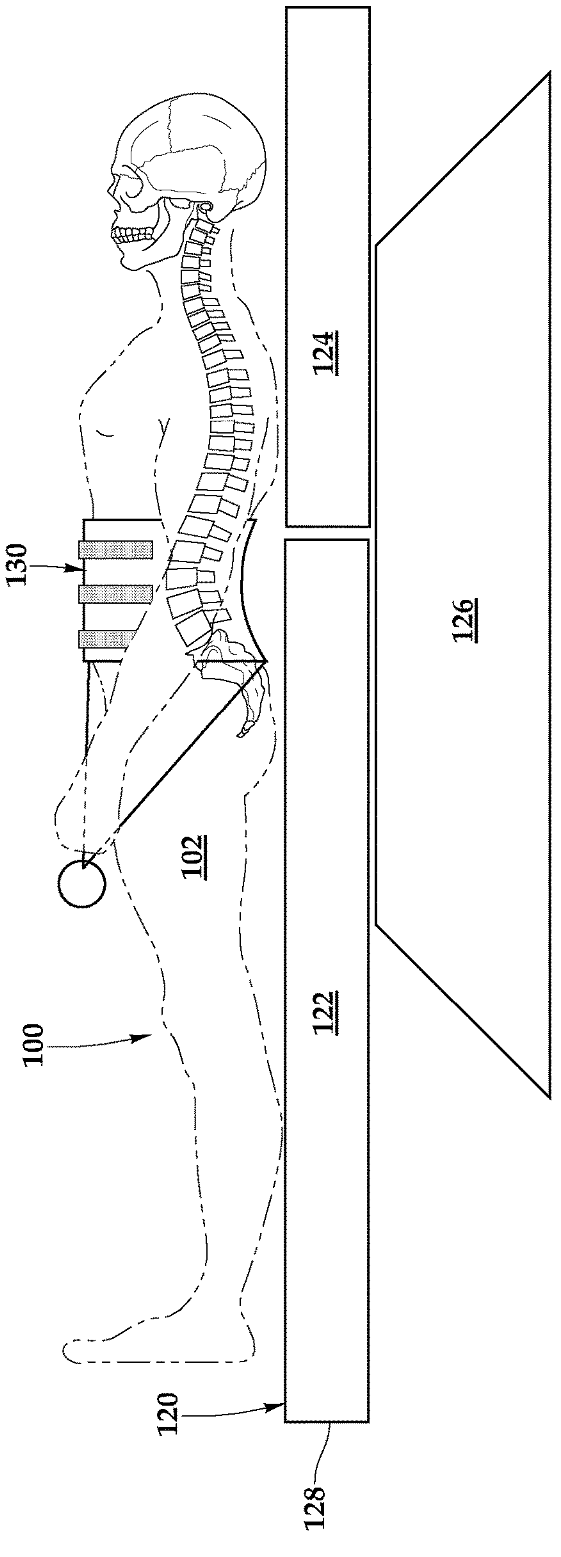
FIG. 1 shows a patient lying supine on a treatment bed with a pelvic harness applied.
Figure 2:
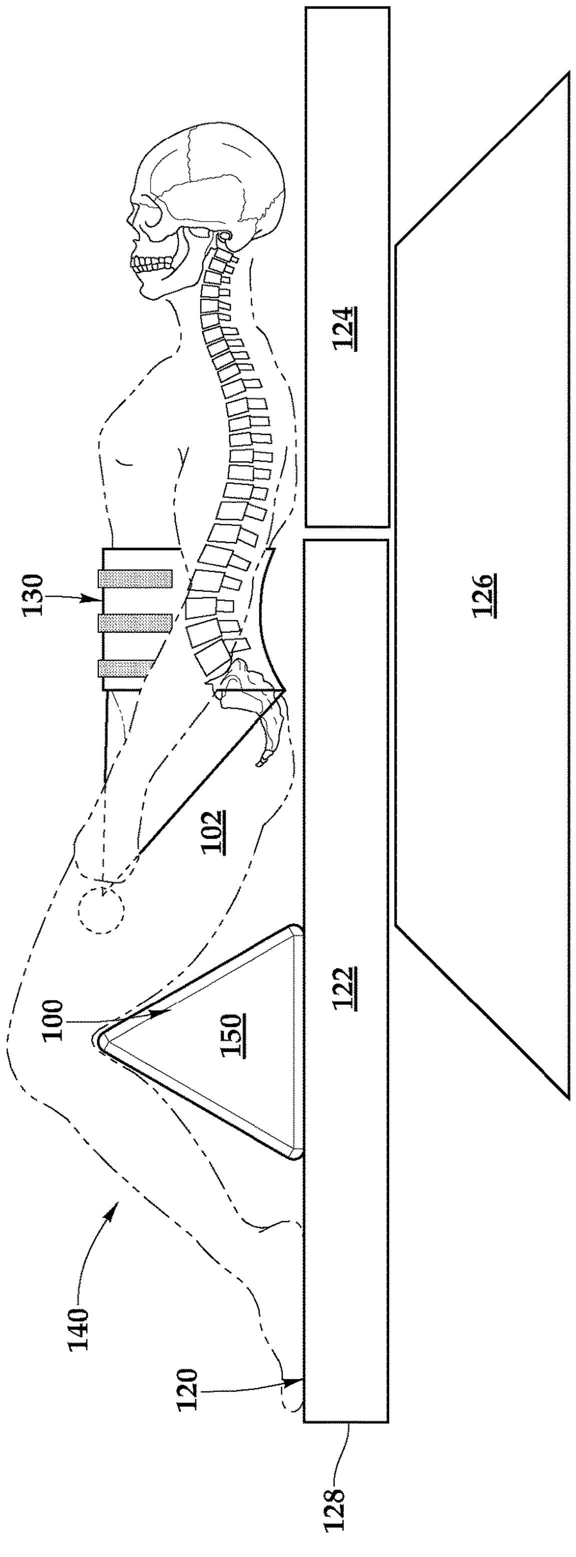
FIG. 2 depicts a patient having a pelvic harness applied and a knee support positioned underneath the patient's knees.

Turning now to FIGS. 1 and 2, these figures are side views of therapy apparatus 100 and therapy apparatus 140, respectively. Patient 102 is lying supine on a treatment bed 120 with a pelvic harness 130 applied around the lumbar region of patient 102. Treatment bed includes lower mattress 122 and upper mattress 124, both connected to base 126. Lower mattress 122 has a proximal end 128 disposed at the feet of patient 102. In addition to the components incorporated into therapy apparatus 100, therapy apparatus 140 further includes knee support 150 shaped and sized to position the knees of patient 102 a fixed distance above the top surface of lower mattress 122. In certain embodiments, knee support 150 may be built into treatment bed 120. In other embodiments, knee support 150 may be removable, replaceable and/or adjustable.

Figure 3A:
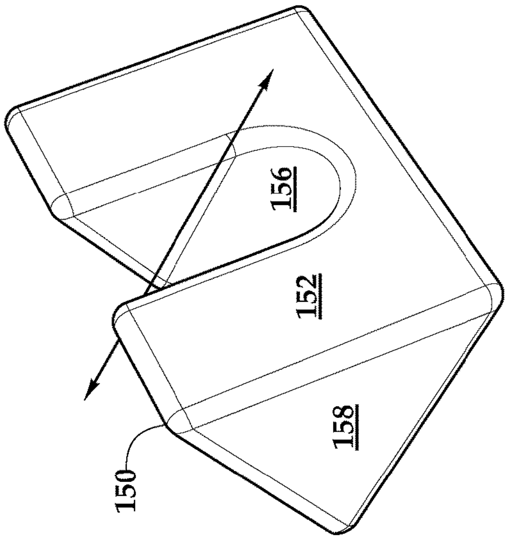
FIG. 3A depicts a three-quarters view of one embodiment of a knee support useful in connection with the present disclosure.
Figure 3B:
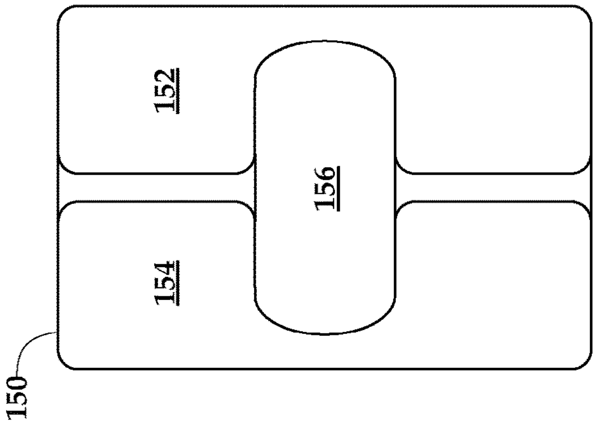
FIG. 3B is a top view of the knee support shown in FIG. 3A.
Figure 3C:
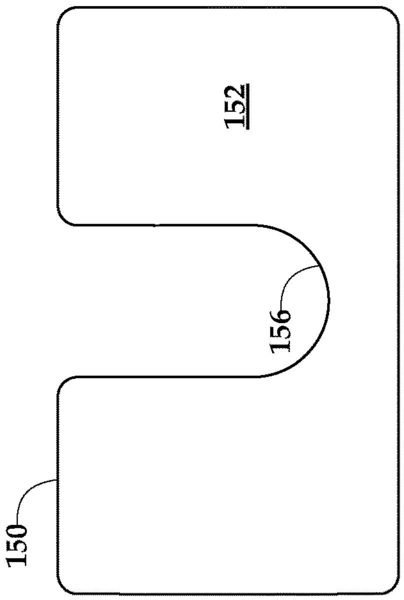
FIG. 3C is a side view of the knee support shown in FIGS. 3A and 3B.
Figure 3D:
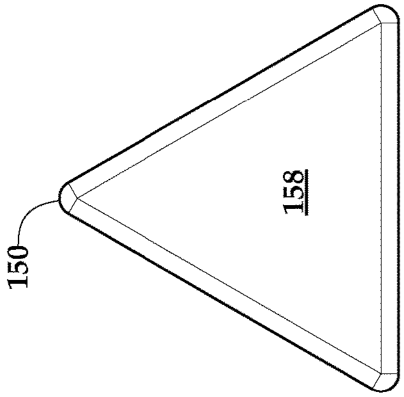
FIG. 3D is an end view of the knee support shown in FIGS. 3A-3C.

FIGS. 3A-3D show one embodiment of a knee support 150 from a variety of viewpoints. FIG. 3A shows knee support 150 from a three-quarters viewpoint. FIG. 3B shows knee support 150 from the top. FIG. 3C shows knee support 150 from a side view. FIG. 3D shows knee support 150 from an end view. Knee support 150 may reduce the lordosis of the lumbar spine and thus reduce the amount of height the decompressive force generator needs to be raised to align the lumbar vertebra/intervertebral discs. Knee support 150 may also provide additional comfort to the supine patient.

As seen in FIGS. 3A-3D, knee support 150 has a prismatic shape incorporating sloped flank surfaces 152 and 154. A u-shaped center channel 156 passes from flank surface 152 to flank surface 154. As described in further detail below, center channel 156 is provided in order that the connection point and straps of pelvic harness 130 may be connected to a decompressive force generator.

In the embodiment of knee support 150 shown in FIGS. 3A-3D, the ends of knee support 150 are capped by end surfaces 158. Knee support 150 may be constructed of any material and feature whatever internal structure may be necessary to provide sufficient rigidity and strength to support a patient's legs and resist the decompressive tension imposed by the therapy device. Such materials and structural details are well known to those of skill in the art of machine design.

Figure 5:
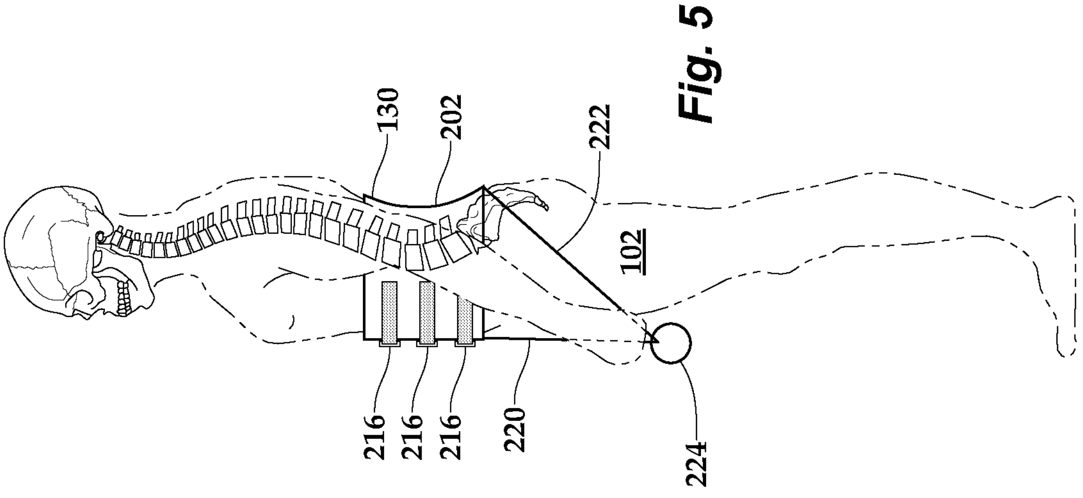
FIG. 5 shows a textile wrap positioned and secured appropriately about a patient's lower torso.
Figure 4:
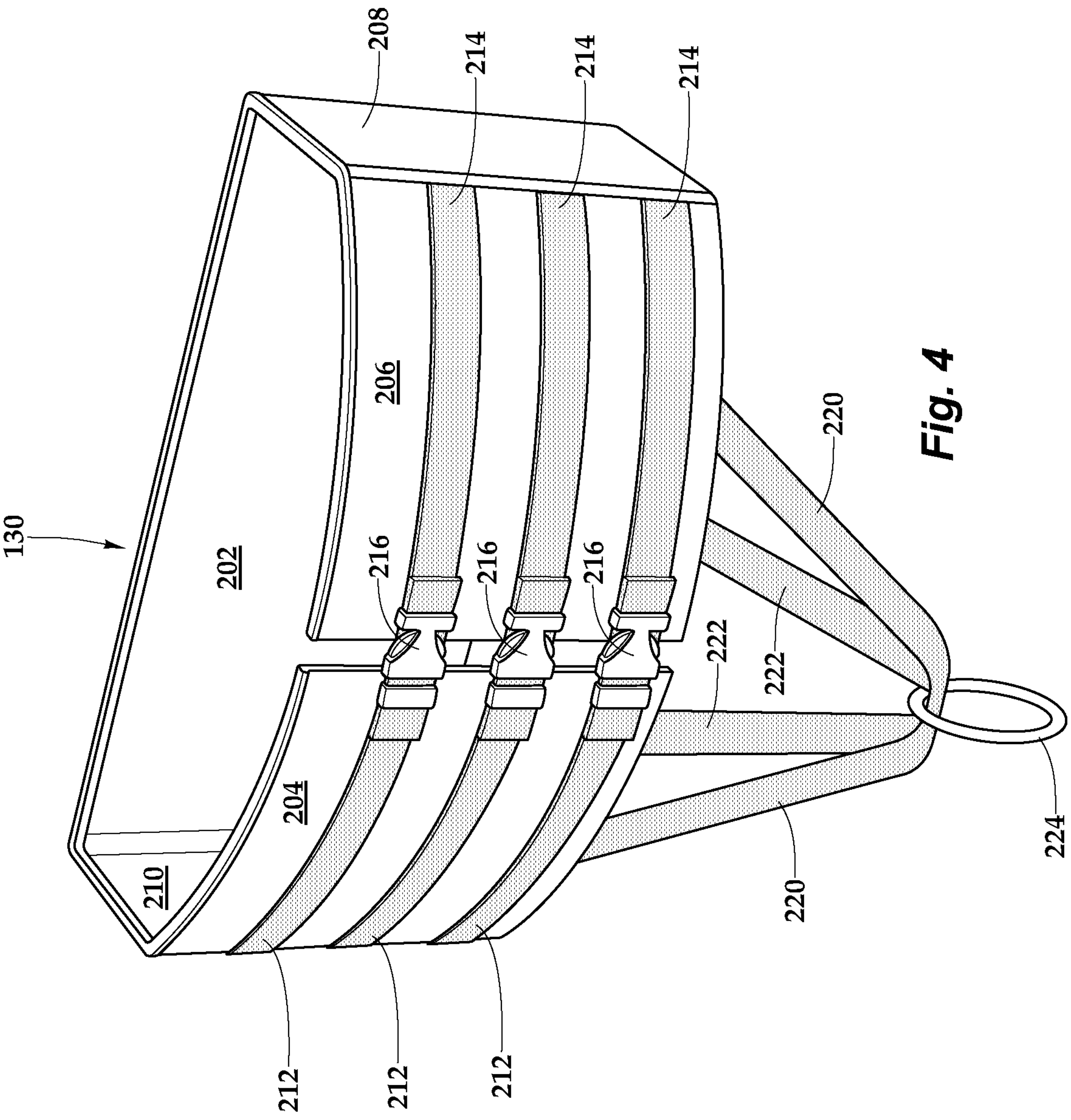
FIG. 4 shows a pelvic harness having a textile wrap suitable for use with the present disclosure.

Turning now to FIGS. 4 and 5, these figures provide additional detail relating to pelvic harness 130. FIG. 4 shows pelvic harness 130 from a three-quarters view. FIG. 5 shows pelvic harness 130 installed on patient 102. In one embodiment, this wide textile 'wrap' is meant to encompass the full circumference of the lower back of patient 102.

Pelvic harness 130 has a rear portion 202, a pair of front portions 204 and 206, and a pair of side portions 208 and 210. Front portion 204 has an array of straps 212 disposed longitudinally and oriented circumferentially along front surface 204. Similarly, front portion 206 has a mating set of straps 214 disposed and secured thereto. An array of buckle clips 216 secure straps 212 to straps 214. In the embodiment shown in FIG. 4, buckle clips 216 are "Fastex" style clips, but other styles of securement can be employed in alternate embodiments, as will be understood and appreciated by those of skill in the art. Together, straps 212 and 214 tighten and secure pelvic harness 130 about the waist of patient 102.

A set of four straps extend from the bottom of pelvic harness 130. Two rear straps 222 extend from either side of center at the bottom of the rear portion 202 of pelvic harness 130. Additionally, two straps 220 extend from either side of center at the bottom of the front portions 204, 206 of the wrap, one from front portion 204 and one from front portion 206. Straps 220, 222 extend to an attachment point 224. In the embodiment shown in FIG. 4, attachment point 224 is a circular stainless steel ring. Alternate embodiments may use d-rings, snaps, loops, carabiners or any of a variety of quick-disconnect mechanisms without departing from the spirit and scope of the present disclosure.

According to one method of applying pelvic harness 130 to patient 102, patient 102 is standing and pelvic harness 130 is applied to the patient 102 with all buckle clips 216 disconnected. Patient 102 steps through either the left or right opening provided by the front strap 220 and rear strap 222 on that side. As an example, patient 102 may extend their right foot and leg through the right side front strap 220 and rear strap 222, and then likewise their left foot and leg through the left side front strap 220 and rear strap 222, such that attachment point 224 hangs between the legs of patient 102. Pelvic harness 130 may then be positioned appropriately about the lower back of patient 102 and secured in place by tightening and buckling securing straps 212, 214 at buckle clips 216.

With pelvic harness properly secured to patient 102, patient 102 is then placed supine on treatment bed 120, with the feet of patient 102 facing the proximal end 128 of lower mattress 122 as shown in FIGS. 1 and 3. As briefly described above and described in further detail below, cyclical decompressive forces will ultimately be provided during treatment.

In certain applications, the weight of patient 102 and the friction of the mid and upper body of patient 102 against treatment bed 120 may be sufficient to provide opposition to the decompressive forces, thereby preventing the body of patient 102 from sliding toward the source of the decompressive force. In certain embodiments, arm posts may be disposed in the upper mattress and positioned such that the patient's underarms and the arm posts are coincident, thereby providing additional opposition to the decompressive forces being applied. Such structures will prevent the body of patient 102 from sliding towards the source of the decompressive force.

In certain embodiments, an upper body harness, having a similar construction to pelvic harness 130, may be secured to the upper body of patient 102 and connected to the distal end of the bed near the patient's head. Such a harness would provide additional opposition to the decompressive forces applied to prevent the body of patient 102 from sliding towards the decompressive force origin.

Whatever mechanisms employed to restrain the body of patient 102, it is highly advantageous to secure the body of patient 102 such that the patient body does not slide towards the source of decompressive force. If the body of patient 102 is not held in place by friction or otherwise, the therapeutic effect of the decompressive forces applied to patient 102 will be reduced.

Figure 6:
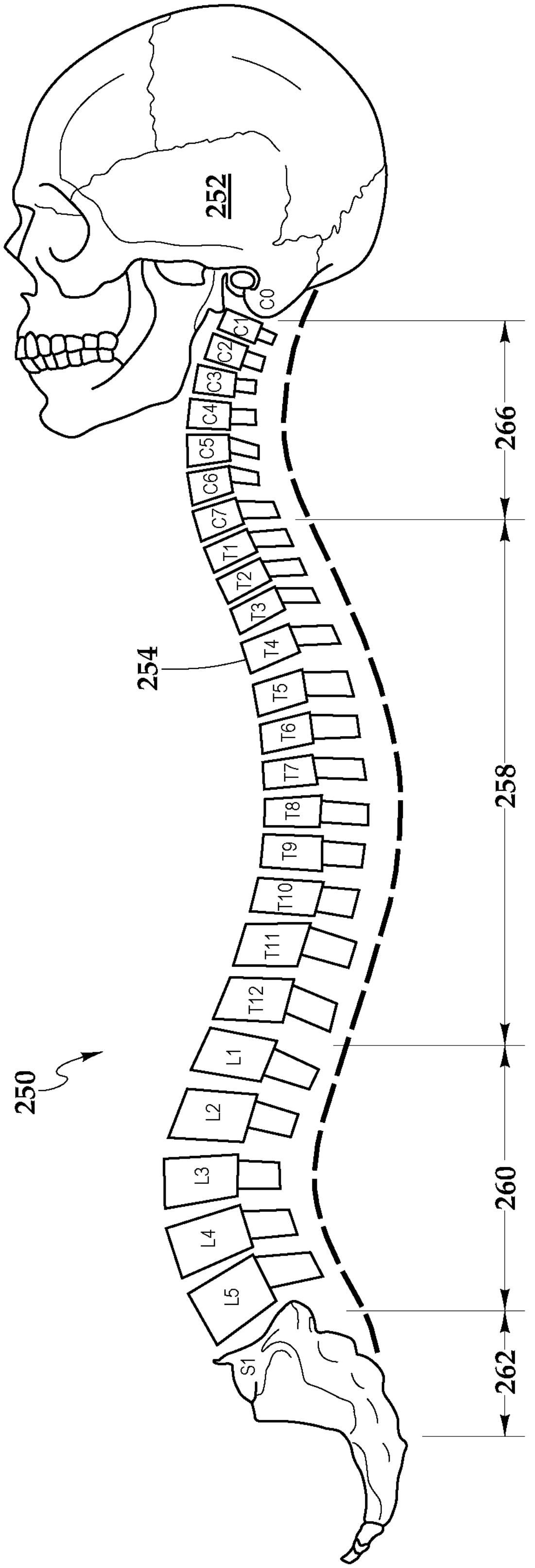
FIG. 6 shows a side view of a of the skull and the cervical, thoracic, lumbar and sacral spine.
Figure 7:
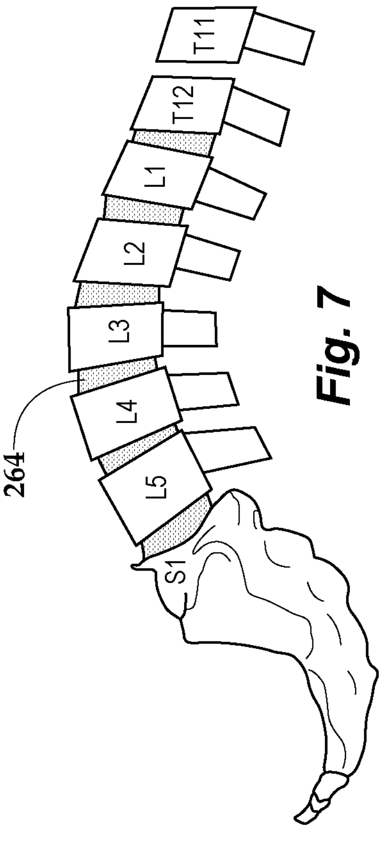
FIG. 7 shows a side detail view of the lumbar and sacral portions of a human spine, with adjoining intervertebral lumbar discs.

The process of decompressive therapy is best understood and explained with reference to the structure of the human spinal column, which is shown in FIGS. 6 and 7 and designated 250. As seen in these figures, the human spine consists of four distinct regions of bony vertebra 254 below the skull 252, which are connected by intervertebral discs. These regions consist of the cervical region 256 nearest the skull 252, thoracic region 258, lumbar region 260 and sacral region 262. Cervical region 256 consists of locations labeled "C0", "C1", "C2", "C3", "C4", "C5", "C6", and "C7". Thoracic region 258 consists of locations labeled "T1", "T2", "T3", "T4", "T5", "T6", "T7", "T8", "T9", "T10", "T11", and "T12". Lumbar region 260 consists of locations labeled "L1", "L2", "L3", "L4", and "L5". For the purposes of traction and decompression therapy of the human spine, the only relevant location of Sacral region 262 is labeled "Sl".

The vertebra 254 are bone structures which vary according to the segment and region of the backbone. Most vertebra are connected by intervertebral discs 264 which allow slight movement of the vertebra and act as "shock absorbers" for the spine 250. The structure of the intervertebral discs 264 is complex. The function of each intervertebral disc 264 is dependent primarily on the nucleus pulposus (the central portion of each intervertebral disc 264) which performs the function of load distribution within the spine 250. Intervertebral discs 264 are labeled according to the identification of the adjacent vertebrae. The intervertebral disc 264 located between vertebra L3 and vertebra L4, for example, is identified as "L3-4".

There is a normal curvature of the spine, the so called 'S-Curve'. There is a normal 'lordosis' (forward curve) of the cervical region 256 and lumbar region 260. There is a normal 'kyphosis' (backward curve) of the thoracic region 258 and sacral region 262.

Various non-optimal states of the spine 250 may be treated with either traction or decompression. Regarding compressive forces normally experienced by the spine, the intervertebral discs 264 rely on the annulus fibrosus (an outer ring of the intervertebral disc 264) and the nucleus pulposus which distributes compressive forces in all directions to minimize the compression. The annulus fibrosus consists of fibrocartilage surrounding the nucleus pulposus which distributes compressive forces in normal day-today use. The annulus fibrosus in and of itself functions to withstand some portion of compressive forces in normal day-to-day use. There are several conditions which can reduce the (anti-compressive) function of the annulus fibrosus and nucleus pulposus.

'Herniation' is the term which describes deformation of the annulus fibrosus which allows the gel-like nucleus pulposus to protrude, distorting muscular function and/or putting pressure on nearby nerves. Commonly referred to as 'slipped disc', the disc is not physically slipped. It may bulge, usually in one direction. By unloading the intervertebral disc, the bulge may be pulled back into position and the intervertebral disc can heal and function normally. 'Degeneration' is a condition in which the intervertebral discs, either through repeated stress injuries, aging, or genetic predisposition, reduce function of the intervertebral disc and can lead to back pain.

Traditional techniques for spinal therapy have various limitations. The paraspinal muscles, which connect the spinal vertebra, may contract over time during traction therapy, which can lessen the effectiveness of the therapy and may even exacerbate the condition of the spine. Care must be taken by the patient and the healthcare provider for patients seeking treatment to avoid this.

The decompression therapy described herein involves cyclical decompressive force rather than static force. The therapy disclosed may further include specific alignment of the lumbar intervertebral discs and vertebra such that decompressive forces applied pull 'through' and to the specific disc or discs that are to be treated.

According to the present disclosure, the decompressive forces applied to the lumbar spine are cycled between higher levels of decompressive forces and lower levels of decompressive force. Rather than applying continuous decompressive force, the decompressive force is applied for a specific period of time, then relaxed, and then reapplied, the cycle being repeated during the treatment. The decompressive force is applied temporarily, then relaxed, thereby reducing the likelihood that the paraspinal muscles will contract and limit or prevent further unloading of the intervertebral disc.

The present disclosure also involves specific alignment of the lumbar vertebra/intervertebral discs such that decompressive forces applied pull 'through' and to the specific disc or discs that are to be treated.

Figure 8:
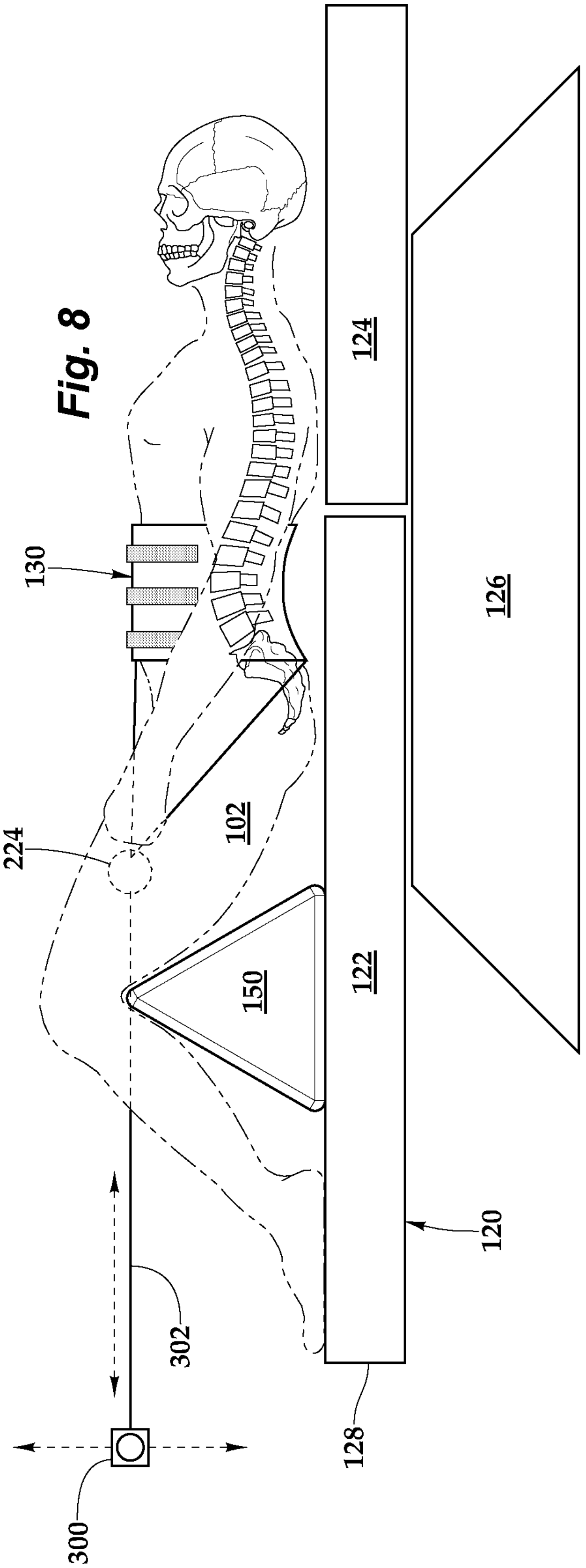
FIG. 8 shows the patient and system of FIG. 2 with additional functional elements shown.

Turning now to FIG. 8, the system of FIG. 2 is shown therein, in combination with additional functional elements. In particular decompressive force actuator 300, is shown near proximal end 128 of lower mattress 122 of treatment bed 120. Decompressive force actuator 300 is attached to a first end of tension cable 302, which is attached at its other end to attachment point 224 of pelvic harness 130. Tension cable 302 passes through center portion 156 of knee support 150.

Actuator 300 may be moved upwards or downwards to change the alignment of pelvic harness 130 and thus the lumbar vertebra and intervertebral discs. Via actuator 300, tension cable 302 can provide a decompressive 'pull' or corresponding relaxation of the decompressive forces.

Figure 9:
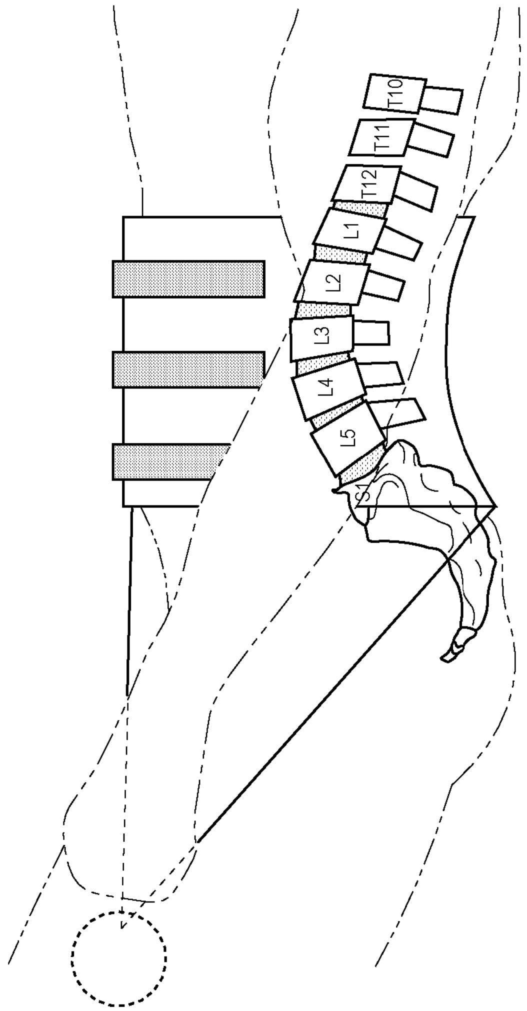
FIG. 9 shows a side detail view of the lumbar and sacral regions of the spine of the patient shown in FIG. 8.

FIG. 9 is a detail view of the lumbar spine of patient 102 undergoing the therapy as shown in FIG. 8. The lumbar intervertebral discs are shown within the normal lordosis of the lumbar spine 260, which may be reduced due to the application of knee support 150.

According to certain embodiments of the present disclosure, the therapeutic procedures involve both a cycling of decompressive forces and alignment of the vertebra/intervertebral discs such that decompressive forces pull those aligned discs. Cycling of decompressive forces allows for a partial regression towards lordosis during the low tension or no tension phase of the decompression cycle. It is known that the intervertebral discs draw in fluids through flexion (a result of differences in intradiscal pressure). Thus, as the vertebra and intervertebral discs are allowed to slightly flex between alignment and at least partial return towards lordosis, the intervertebral discs are allowed to further rehydrate, restoring intervertebral disc function.

Figure 10:
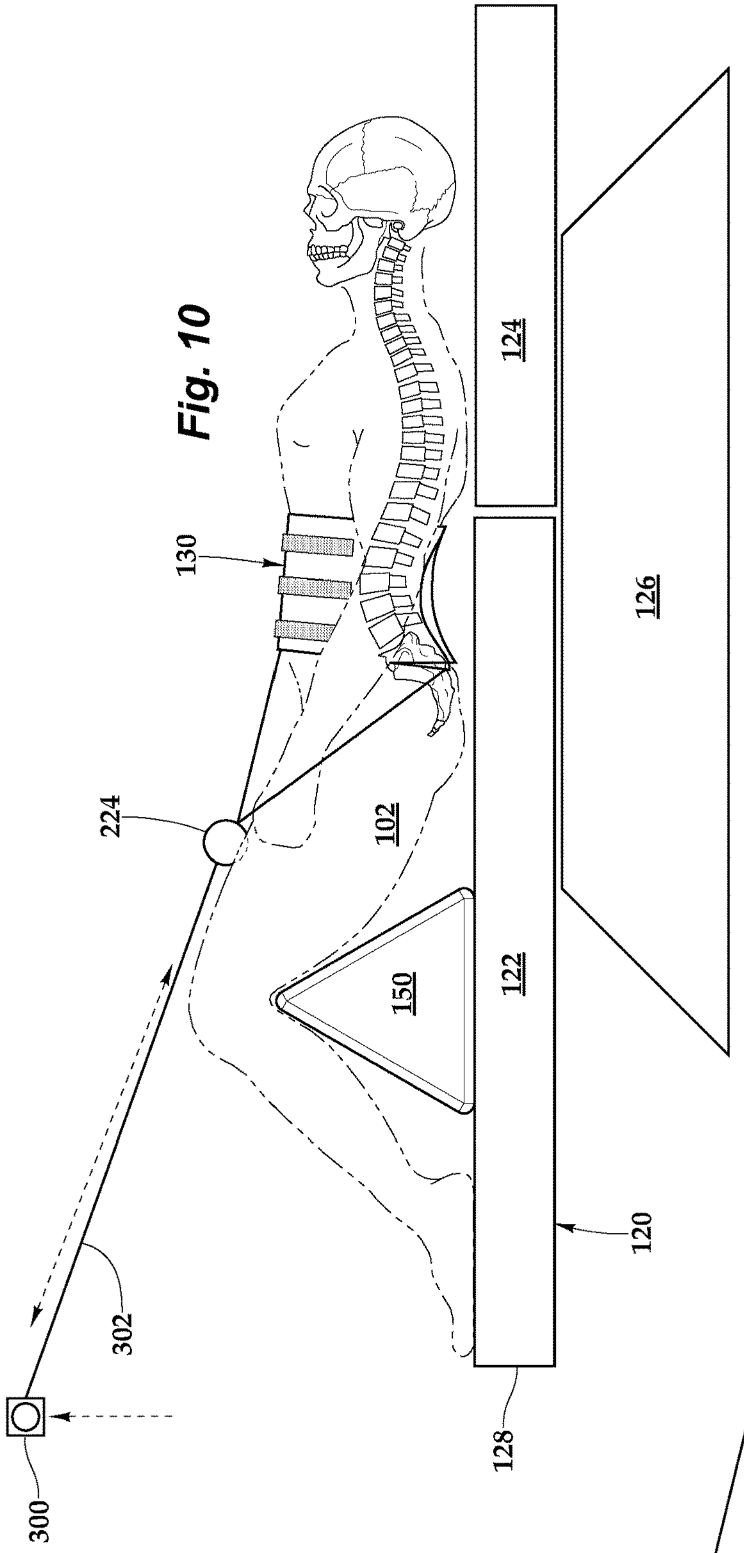
FIG. 10 depicts the patient of FIG. 8, with the actuators raised to a height sufficient to align the vertebra and intervertebral discs.
Figure 11:
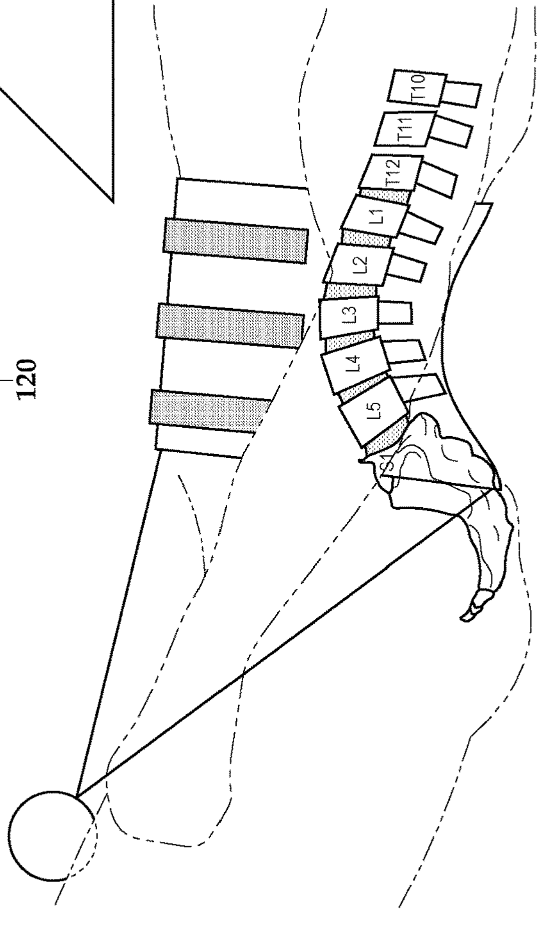
FIG. 11 shows a close-up of the lumbar spine of FIG. 16, to further illustrate the alignment of the intervertebral discs.

FIG. 10 depicts the system of FIG. 8, with decompression actuator 300 raised to a height sufficient to align the vertebra and intervertebral discs connecting L1 through L4. Decompression actuator 300 is shown raised from its previous position, thereby creating an upward angle of pull. The tension cable 302 and the direction of pull or relaxation is shown. As described above, tension cable 302 is connected at a first end to actuator 300 and at a second end to attachment point 224 of pelvic harness 130. In this arrangement, straps 220 and 222 of pelvic harness 130, connected to attachment point 224, are elevated in line with tension cable 302, which rotates pelvic harness 130 in a likewise manner. Pelvic harness 130, rotated in this manner, reduces the lordosis of the lumbar spine 260, the angle illustrated sufficient to align the vertebra L1 through L4 and associated intervertebral discs. At the angle shown in FIG. 10, the specific intervertebral disc to be treated is L3-4. This can be seen more clearly in FIG. 11.

As stated previously, enhanced therapy as disclosed herein can include both a cycling of decompressive forces and targeted alignment of the vertebra/intervertebral discs, such that decompressive forces pull those aligned discs. These two actions accomplish controlled elongation of the spine while upregulating vertebral disc rehydration. Such compression and decompression can be effectuated using a variety of approaches. At least one embodiment of the present disclosure employs a spinal decompression device utilizing piecewise loading and unloading curves to configure the manner in which those forces are cycled and applied over time to the patient's spine.

Figure 12:
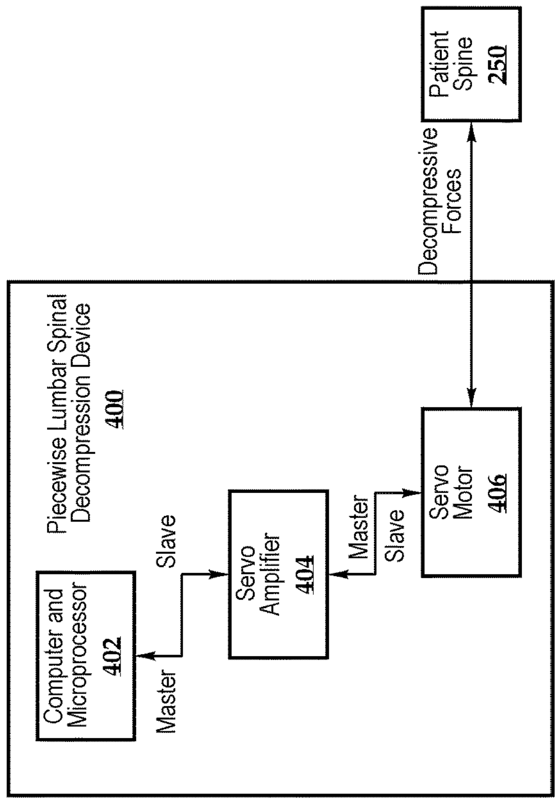
FIG. 12 is a block diagram showing one embodiment of a spinal decompression device according to the present disclosure.

FIG. 12 shows a block diagram of a piecewise lumbar spinal decompression device 400. Device 400 incorporates computer and microprocessor 402, servo amplifier 404 and servo motor 406. In one embodiment of the present disclosure, actuator 300 includes servo motor 406, which is directly controlled by servo amplifier 404, which is itself in constant communication and controlled by computer 402. Servo motor 406 provides precise control of the decompressive forces applied to the patient's spine and provides feedback to servo amplifier 404. Such feedback may include data relating to present position and velocity, torque applied, gain applied, electrical power consumed relative to force produced and arc distance traveled. Servo amplifier 404 may contain its own microprocessor which evaluates the feedback from the servo motor 406, compares that to databases contained within its own memory and determines what the actual decompressive force is at a given time. This comparison, occurring within the microprocessor of servo amplifier 404 and between servo amplifier 404 and servo motor 406, may occur in some embodiments up to 4,000 times per second.

Computer 402 may poll servo amplifier 404 at least ten times per second, and in some embodiments up to 4,000 times per second, for the actual decompressive force being applied. Utilizing this data, computer and microprocessor 402 provides servo amplifier 404 with instructions as to where the decompressive force should be. These instructions may be provided at the same frequency as the polling of decompressive force data. Servo amplifier 404 may then precisely modify the decompressive force being applied to exactly that value most recently received from computer and microprocessor 402, by modifying the power applied to servo motor 406.

Figure 13:
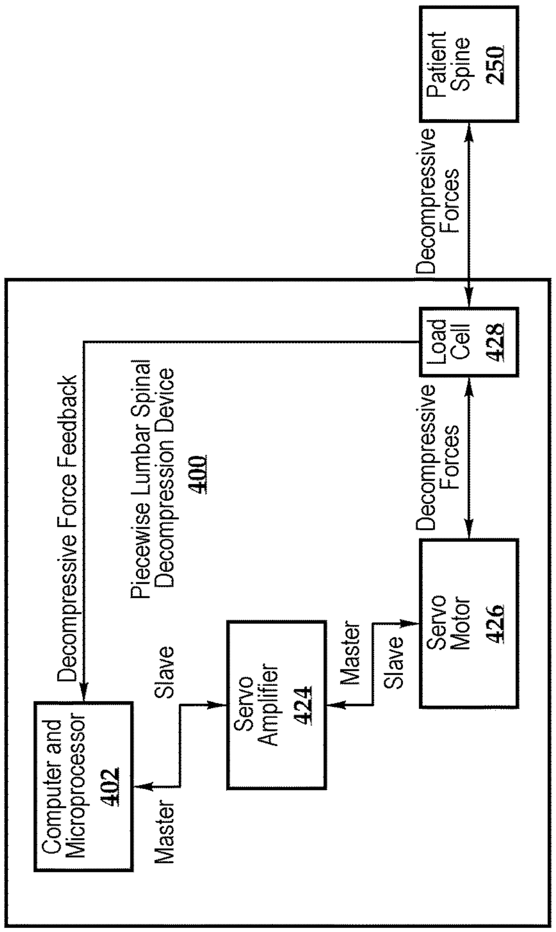
FIG. 13 is a block diagram showing a second embodiment of a spinal decompression device according to the present disclosure.

FIG. 13 depicts an alternate embodiment of the device shown in FIG. 12. In this embodiment, a load cell 428 is included between the servo motor and patient, along the tension cable communicating the decompressive forces. Load cell 428 provides additional measurement of the applied decompressive forces to the device.

As seen in FIG. 13, device 420 incorporates computer and microprocessor 422, servo amplifier 424 and servo motor 426. Elements 422, 424 and 426 have much the same functionality as elements 402, 404 and 406 described above in connection with FIG. 12. The addition of load cell 428 provides additional feedback on top of the feedback received within the servo system. In certain embodiments, the feedback from load cell 428 will be a direct reading of tension within tension cable 302, and thus a measurement of the decompressive force being applied to the spine 250 of patient 102. In an alternate embodiment, load cell 428 is connected directly to servo amplifier 424.

The description above is provided to illustrate the hardware necessary to precisely control an unloading curve for decompressive forces applied to a patient's spine in real-time, and is intended to describe a particular embodiment of the decompressive therapy. The multiple effects discussed herein act synergistically to facilitate spinal elongation and intervertebral disc rehydration.

Cycling of spinal decompressive forces accomplishes two additional tasks, both of which are requisite to accomplishing true spinal decompression and intervertebral disc rehydration. The first task involves the avoidance of paraspinal muscle guarding. The paraspinal muscles are known to reflexively protect the spine from rapid changes in the load on the spinal column. This occurs through involuntary muscle contraction of the paraspinal muscles. When standing, the load on the spinal column is the force of gravity exerting itself on the human body. Loading on the spine may also constitute forces decompressing or unloading the spine.

In general, though not necessarily so, decompressive forces are cycled between maximum and minimum negative loads. The minimum decompressive force may equate to as little as zero applied decompressive force on the patient's spine. The avoidance of rapid changes in the decompressive force applied to the spine avoids eliciting paraspinal muscle guarding due to said rapid changes in load.

Figure 14:
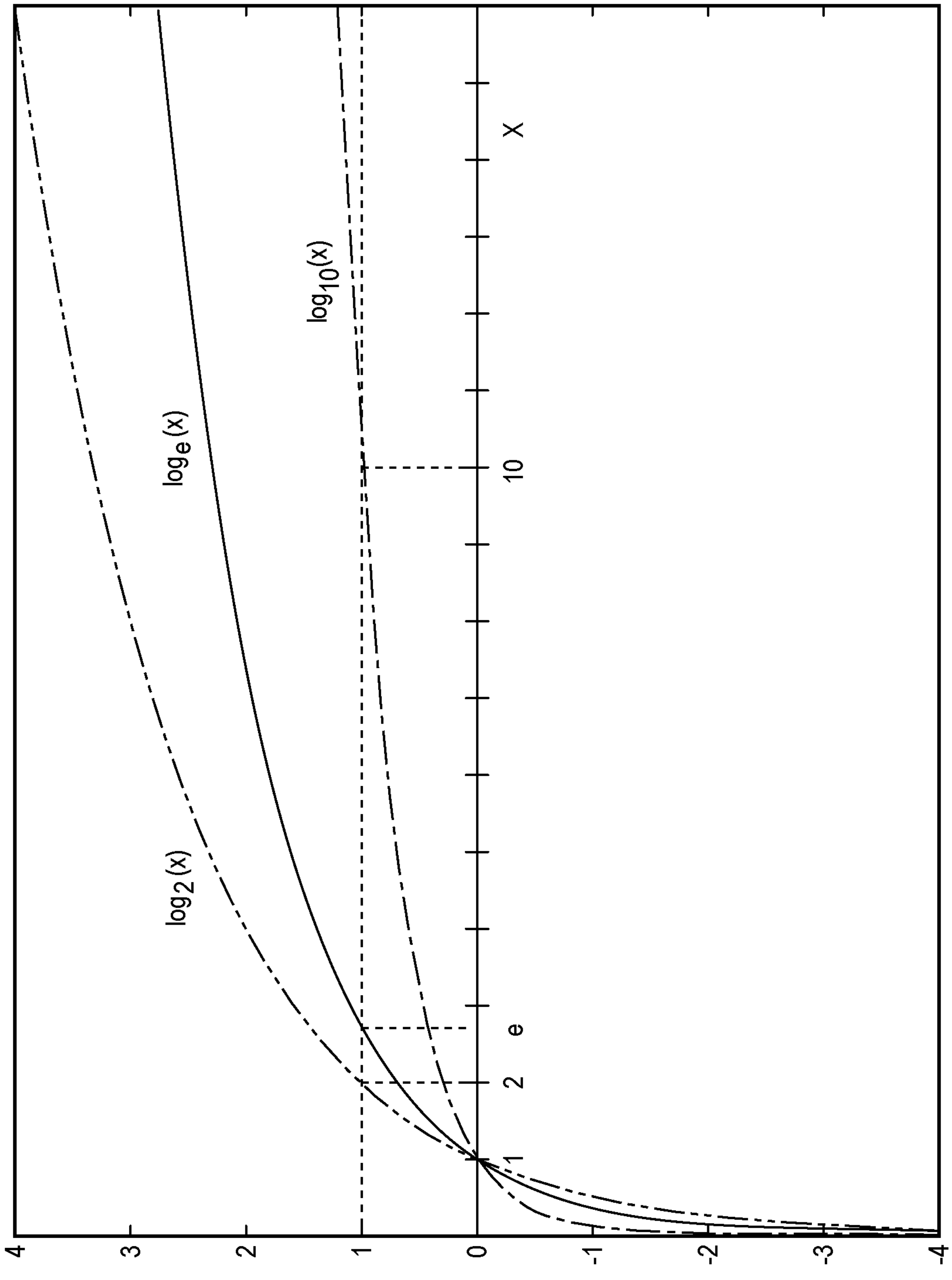
FIG. 14 shows a decompressive force unloading curve ascending from zero pounds to a maximum load.

Mathematically, a function utilized across many fields of scientific endeavor, including engineering, physics, navigation, and even psychology and psychophysics, provides at least one embodiment of the unloading curve utilized by the spinal decompression device of the present disclosure. This function is the logarithm, or here the 'logarithmic curve'. This curve is given as:

$$\log_b(x) = Y$$

where 'x' may be given as time, 'Y' is the decompressive force applied, in for example pounds (lbs.), and 'b' is the logarithmic base. Plots of various logarithmic functions are provided in FIG. 14. As seen in FIG. 14, $\log_2(x)$ rises from zero pounds at time x=1 up to 4 after x=10. As the logarithmic curve proceeds along the x-axis, the slope of the curve levels off considerably for higher levels of x. According to certain embodiments of the present disclosure, the spinal decompression device may be capable of up to 50 lbs. of continuously applied decompressive force, and in others up to 100 lbs., and in still others up to and beyond 150 lbs.

The device according to one embodiment of the present disclosure allows the healthcare provider or authorized user the ability, through a user interface, to input into the computer the treatment parameters that will be used by the computer's microprocessor to calculate the full spinal decompressive force unloading curve that will be applied to the patient's spine. The parameters include, but are not limited to the following parameters:

a) Maximum Spinal Decompressive Force (lbs.)
b) Minimum Spinal Decompressive Force (lbs.)
c) Maximum Unloading Time (seconds)
d) Minimum Unloading Time (seconds)
e) Number of Decompressive Cycles to be Applied (whole number >=1)

Based on these parameters, the computer constructs a piecewise unloading profile. This unloading profile may include a variety of components, including values for initial unloading, maximum spinal decompressive force and minimum spinal decompressive force. The pieces, which may also be referred to as 'segments' or 'phases' of the treatment profile, transition between these values.

Figure 15A:
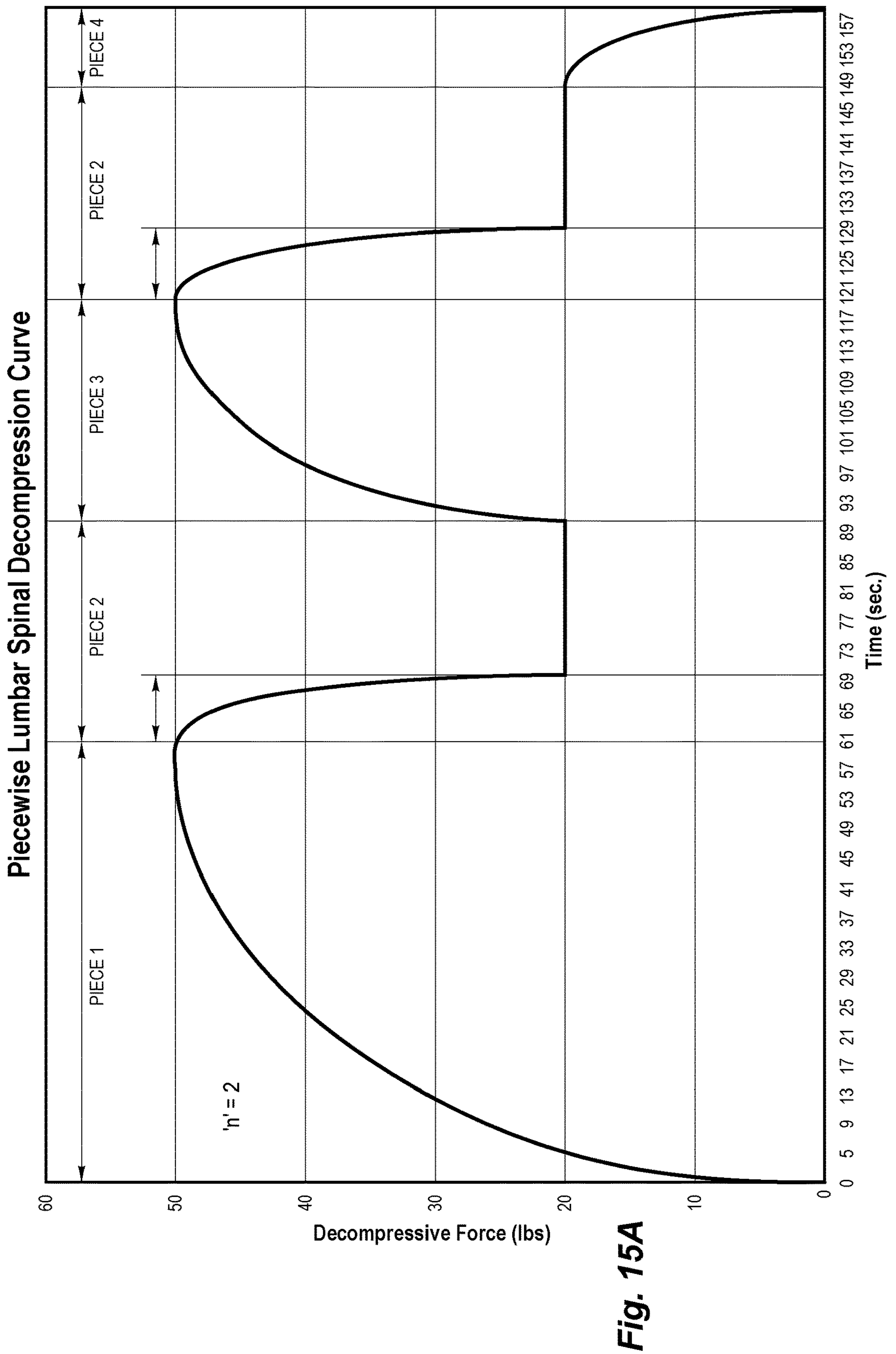
FIG. 15A depicts a first piecewise decompressive force curve in its constituent segments.

In an initial unloading phase, designated as Piece 1 in FIG. 15A, the treatment profile transitions from the initial unloading value up to the maximum spinal decompressive force. The 'initial unloading' phase is to condition the paraspinal muscles to the movement involved in spinal decompression more gradually during the first decompressive force cycle. In one embodiment, the calculation employed to derive the unloading curve according to the user's input parameters utilizes a value of two times the maximum unloading time as the 'x' component, the maximum spinal decompressive force as the 'y' component, and solves for 'b' to generate the logarithmic treatment curve used for that 'piece' of the overall spinal decompression unloading curve for the treatment session.

Piece 1 of the piecewise unloading curve is designed to avoid paraspinal muscle guarding, allowing more time for the paraspinal muscles to stretch, warm up, and accommodate to the unloading. It is not necessarily the intensity of the applied load but the rate-of-change of the applied load that elicits reflexive paraspinal muscle guarding. Paraspinal muscle guarding can be a substantial impediment to achieving spinal elongation and negative intradiscal-space pressures-which are employed to treat herniated discs and facilitate rehydration of intervertebral discs through osmotic transfer of nutrient rich fluids from vertebral disc to vertebra. This piece of the treatment profile will be hereinafter referred to as 'Piece 1'.

A second piece of the curve, identified as 'Piece 2' of the piecewise unloading curve shown in FIG. 15A, continues beyond the apex of applied decompressive force at the end of Piece 1. It may be desirable to change the unloading curve to effect a rapid change in decompressive force, in order to get to the minimum unloading force. To avoid, or at least reduce, paraspinal muscle guarding, the computer may assign a set value to spend in transition to the input minimum unloading decompressive force. The set value may be a variable. An example of a transition value used in certain embodiments is 10 seconds, but other applications may use a longer or shorter time, as appropriate.

The time remaining between the user input minimum unloading time and the transition time is the time spent at the minimum spinal decompressive force. If the user entered 30 seconds for the minimum unloading time, then the actual time spent at the minimum spinal decompressive force would be 20 seconds. Utilizing the user's input parameters, the set maximum-to-minimum unloading as the 'x' component (in this example 10 seconds), the minimum spinal decompressive force as the 'y' component and solves for 'b' to generate the logarithmic treatment curve used for that 'piece' of the overall spinal decompression unloading curve for the treatment session.

As noted, Piece 2 of the piecewise unloading curve is a designed to avoid paraspinal muscle guarding, while spending as much time as possible at the minimum spinal decompressive force. According to one embodiment, the computer determines the maximum-to-minimum decompressive force transition time as a variable as ⅓ that of the minimum unloading time.

At the end of the minimum unloading time, the decompressive force is transitioned back from the minimum to the maximum decompressive force over the specified maximum unloading time as previously described above. In one embodiment, the computer calculates the logarithmic base for the logarithmic increase in decompressive force in order to generate the appropriate function. This piece represents the transition from minimum spinal decompressive force to maximum spinal decompressive force of the piecewise logarithmic spinal decompression device's spinal unloading curve, and is identified in FIG. 15A as 'Piece 3'.

The fourth and final piece of the piecewise decompression curve, designated 'Piece 4' in FIG. 15A, is the final transition from a minimum unloading state to zero applied decompressive force. This represents the transition from final minimum decompression to zero spinal decompressive force. As described above in connection with Piece 2, a decrease in applied decompressive force occurs over a 'set' transition time. As in Piece 2, the time is set in one embodiment as ⅓ that of the minimum unloading time. At the zero decompressive force level, the treatment is effectively finished.

Although the above description relates to a spinal decompression curve incorporating 4 pieces, other embodiments may employ additional pieces. Further, the number of treatment cycles, which may be input by the user, determines the overall number of pieces that make up the patient specific spinal decompression logarithmic loading curve. As an example, for 1-5 cycles, Piece 1, Piece 2 and Piece 4 can be combined together in repetition as shown in FIG. 15A to form a full treatment profile. An extended treatment profile could include the pieces in a sequence such as "1-2-3-2-3-2-4." Other suitable combinations will be apparent to those of skill in the art. Whatever the combination of pieces in the piecewise curve, the overall treatment time is derived as the sum of these pieces.

Figure 15B:
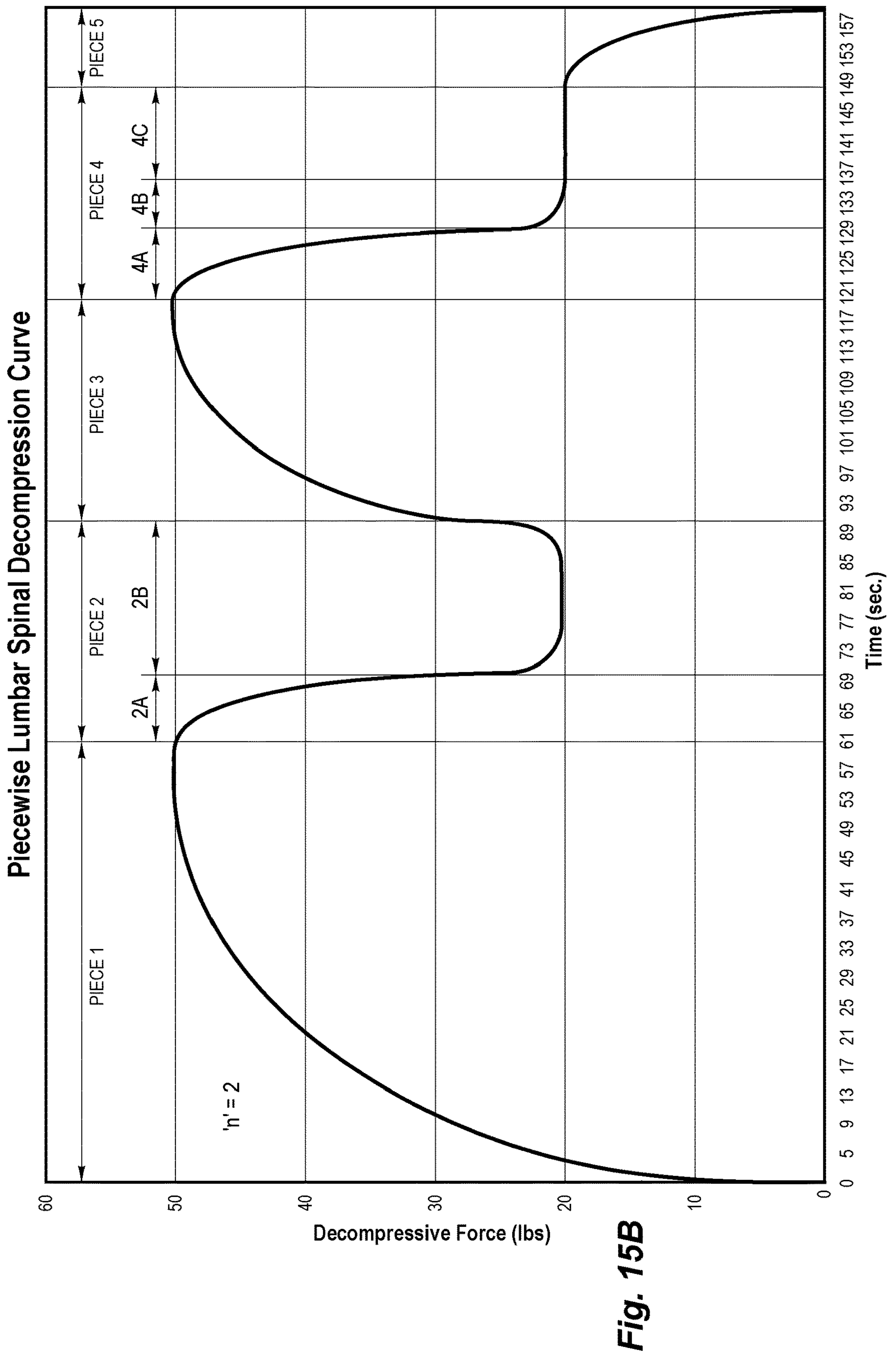
FIG. 15B depicts a second piecewise decompressive force curve in its constituent segments.
Figure 16B:
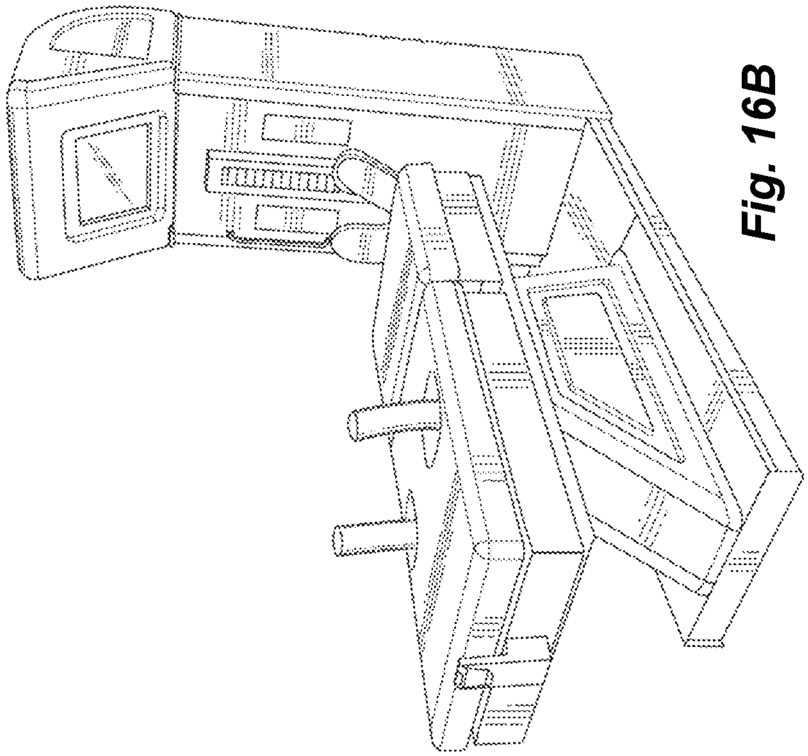
FIG. 16B shows a commercial embodiment of the apparatus of the present disclosure from a second three-quarters viewpiont.
Figure 16A:
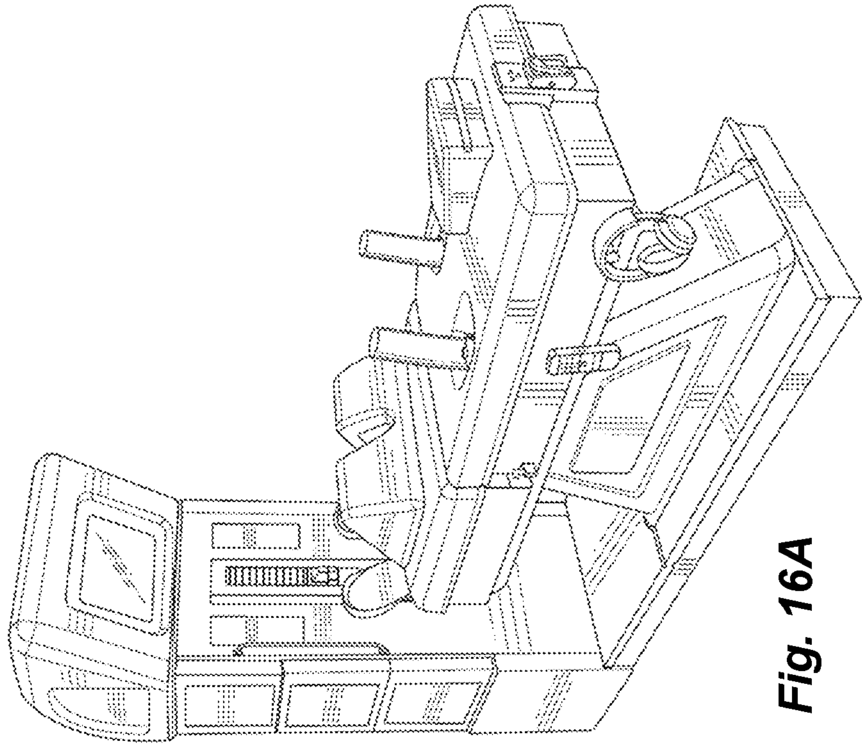
FIG. 16A shows a commercial embodiment of the apparatus of the present disclosure from a first three-quarters viewpoint.
Figure 16E:
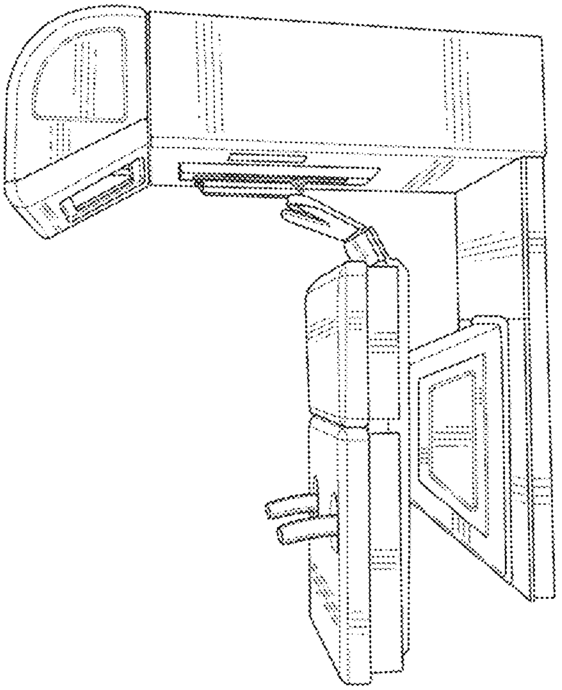
FIG. 16E shows a commercial embodiment of the apparatus of the present disclosure from a side view.
Figure 16D:
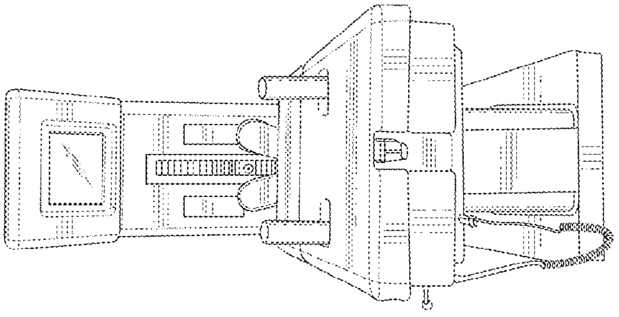
FIG. 16D shows a commercial embodiment of the apparatus of the present disclosure from and end view.
Figure 16C:
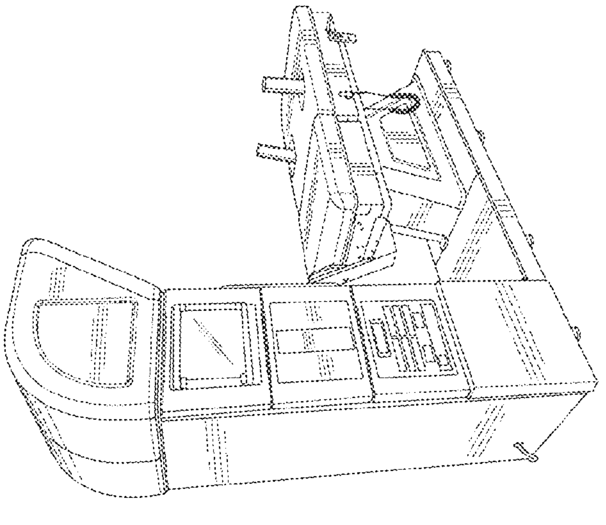
FIG. 16C shows a commercial embodiment of the apparatus of the present disclosure from a third three-quarters viewpoint.

FIG. 15B depicts a second piecewise decompressive force curve in its constituent segments. The piecewise decompressive force curve of FIG. 15B is similar to the decompressive force curve shown in FIG. 15A, but with certain notable changes. In particular, the piecewise force curve of FIG. 15B incorporates smoothed transitions at certain points of the curve in order to further enhance the therapeutic benefits of the present disclosure. Specifically, this curve incorporates segments following the contours of a traditional sigmoid function of the general form:

$$S(x) = (1 + e^{-x})^{-1}$$

As will be known to those of skill in the art, this traditional sigmoid function transitions smoothly from an asymptotic relationship approaching 0 for large negative values to an asymptotic relationship approaching +1 for large positive values.

Owing to the nature of the sigmoid function set forth above, pieces of this sigmoid function can be added in between the logarithmic pieces of the piecewise decompression curve in order to provide smooth transitions in force and rates of change in force during the spinal treatment process. In FIG. 15B, sigmoid pieces are included in the pieces identified as 2B and 4B. In the piece identified as 2B, the curve may be defined, for example, by a formula having the general form of:

$$F(t) = F_{max} - \left(1 + e^{-(c1*t)}\right)^{-1}$$

for the initial downwardly-sloping portion of 2B, and a formula having the general form of:

$$F(t) = \left(1 + e^{-(c1*t)}\right)^{-1}$$

for the closing, upwardly-sloping portion of 2B, where the parameter cl controls the slope of the curve at the inflection point, and thus the rate of change in the applied decompressive force. Those of skill in the art will understand that additional segments of this function and similar functions can be included, as appropriate, to optimize the treatment profile.

In both curves, the piecewise curve essentially distributes the majority of the rate of increase in applied decompressive force at the lower force levels, and applies progressively smaller rates of change at the higher prescribed decompressive force levels. When the decompressive force is relatively small, it can be changed more quickly without eliciting a paraspinal muscle guarding response because the muscles are not triggered reflexively at these lower decompressive force levels.

As the decompressive forces increase, the aligned spine segments elongate more and approach the reflex limits of tension within the paraspinal muscles. While achieving the prescribed maximum spinal decompressive force is not an option, the rate at which the force is reached is variable. In other words, paraspinal muscle guarding is avoided in part the user inputting a safe maximum decompressive force level, and one that will not overly stimulate the paraspinal muscle guarding response. Given that, the device of the present disclosure additionally preferentially distributes the majority of the rate of change of the logarithmically-applied spinal decompression force at the lowest intensity parts of the unloading curve.

By way of illustration, it is useful to contrast the teachings of the present disclosure with regards to a single piece of the piecewise logarithmic curve, Piece 2. Traditional spinal decompression devices generally release decompressive forces from maximum entirely down and to a minimum tension level immediately or via a linear decrease. A sudden release is not advisable as it will exceed the rate of change known to invoke involuntary paraspinal muscle contraction.

A linear decrease in decompressive force maintains a constant rate of change, whereas the logarithmic approach to a descending decompressive force profile employs a much lower rate of change at larger decompressive forces than the linear approach. Further, it allows a higher rate of change at the lower decompressive forces.

The second goal accomplished by the cycling of decompressive forces is that of minimizing the patient's perception of the application of the decompressive forces. This may be referred to as a "psychophysical" advantage of the present disclosure. Avoiding involuntary paraspinal muscle guarding will positively affect the patient's perception of the spinal decompression treatment. Patient perception of the magnitude of change of intensity of a physical stimulus has been shown to be logarithmically related. Stevens's Power Law describes such a relationship, and describes empirically derived constants for a variety of sensory experiences involving all five senses. The form of Stevens's Power Law is:

$$\varphi(I) = kI^{a}$$

where 'I' is the intensity of the physical stimulus, 'φ(I)' is the intensity of the psychological sensation generated by the physical stimulus (a.k.a. 'psychophysically'), 'a' is a value related to the type of physical stimulus, and 'k' is a proportionality constant. Further description of the derivation of 'a' and 'k' is beyond the scope of this disclosure. It is important to utilize Stevens's reported findings for 'a' to understand the psychophysical response to decompressive forces. For example, Stevens reports an 'a' value of 1.45 for "Heaviness", which he describes as resembling lifted weights on the muscles and approximates the force that would be exerted by the paraspinal muscles in a guarding reflex to oppose a rapid change in loading state. Assuming 'k' is equal to or nearly equal to 1, it is plain to see that psychophysical stimulus 'φ(I)' increases exponentially relative to the intensity of the physical stimulus 'I' when 'a' is greater than 1 which is an appropriate assumption. But, this form of Stevens's Power Law describes only an instantaneous value. As consciousness necessarily involves making a comparison between two states or values, and in the case of spinal decompression the relevant comparison is the most recent memory of the perception of the intensity of the physical stimulus and the immediate perception of the intensity of the physical stimulus. In other words, the correct interpretation of the intensity of the physical stimulus is not the instantaneous value 'I', but rather the slope between two physical stimulus intensities '$I_1$' and '$I_0$' which is the rate of change of 'I' which is '(ΔI)' derived as:

$$(\Delta I) - I_1 - I_0$$

Therefore the appropriate form of Stevens's Power Law appropriate to true spinal decompression according to one illustrative embodiment of the present disclosure is found as:

$$\varphi(\Delta I) = k * \Delta I^a$$

It is useful, then, to utilize a logarithmic approach to changing decompressive forces during true spinal decompression therapy throughout treatment to minimize the rate of change of decompressive forces '(ΔI)' during the most intense portions of the decompressive unloading profile to reduce or attenuate the psychophysical element of a spinal decompression treatment session.

Psychophysical stress manifestations include anxiety (which reduces patient satisfaction with treatment and patient compliance with treatment), as well conscious triggering of paraspinal muscle contraction, which can lead to a negative feedback loop between mind and body, ultimately degrading spinal elongation, intervertebral disc rehydration, treatment efficacy and treatment safety.

FIGS. 16A-16E show one embodiment of a commercial embodiment of the apparatus of the present disclosure from a variety of viewpoints.

Figure 17B:
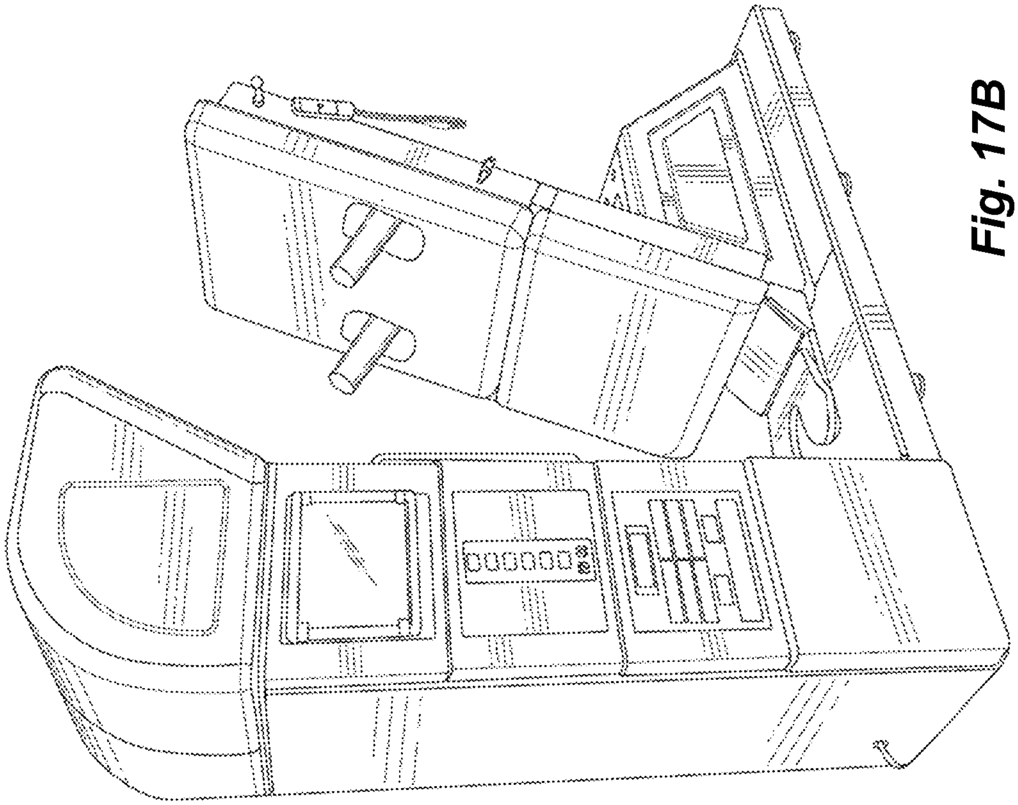
FIG. 17B shows a commercial embodiment of the apparatus of the present disclosure from a second three-quarters view with the therapy bed raised.
Figure 17A:
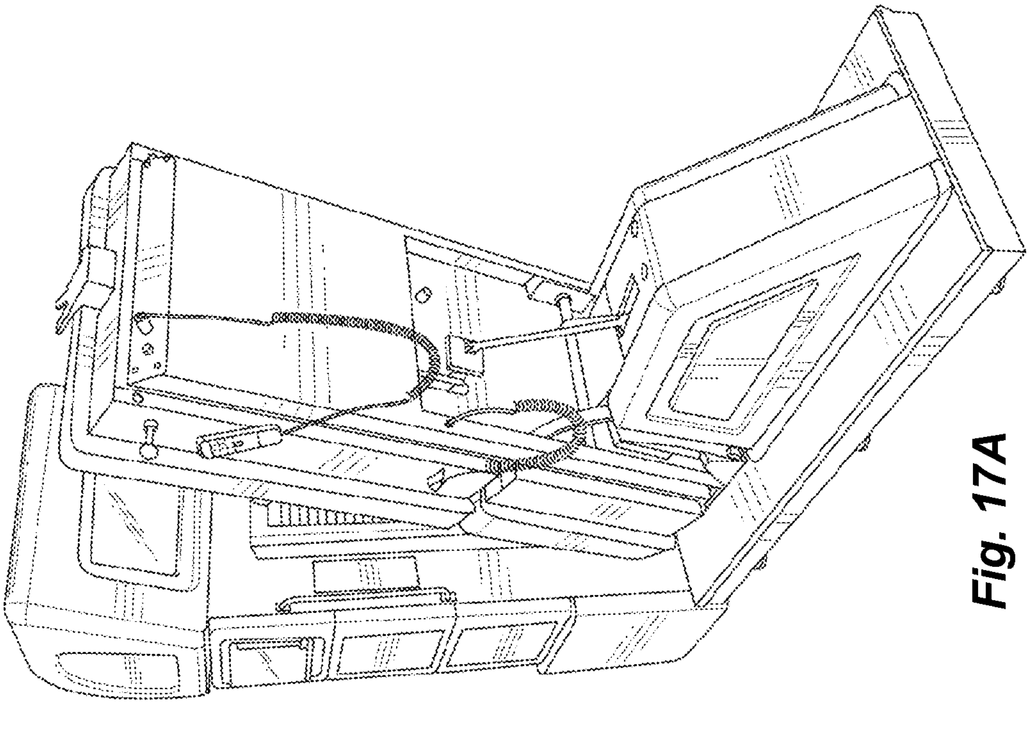
FIG. 17A shows a commercial embodiment of the apparatus of the present disclosure from a first three-quarters view with the therapy bed raised.

FIGS. 17A and 17B show the commercial embodiment of FIGS. 16A-16E with the therapy bed raised, to allow for additional spinal treatment options.

The foregoing summary, as well as the following detailed description of certain embodiments of the present disclosure, will be better understood when read in conjunction with the appended drawings. For the purpose of illustrating the disclosure, certain embodiments are shown in the drawings and described herein. It should be understood, however, that the present disclosure is not limited to the arrangements and instrumentalities shown in the attached drawings.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification or claims refers to at least one of something selected from the group consisting of A, B, C . . . and N, the text should be interpreted as requiring only one element from the group, not A plus N, or B plus N, etc.

The invention claimed is:

1. An apparatus for piecewise spinal decompression therapy comprising:

a decompression actuator disposed adjacent to a therapy bed;

a decompression connection secured at a first end to the decompression actuator and at a second end to an attachment point of a pelvic harness;

a first amplifier connected to the decompression actuator; and a computer connected to the first amplifier;

wherein the computer is operable to control the first amplifier;

wherein the computer controls the first amplifier according to a piecewise logarithmic decompression profile comprising a logarithmic loading phase and an unloading phase;

wherein the unloading phase comprises an unloading transition segment and a minimum spinal decompressive segment;

wherein the minimum spinal decompressive segment comprises an entry transition segment and an exit transition segment;

wherein the unloading transition segment has a transition duration and the minimum spinal decompressive segment has a duration approximately twice the transition duration; and wherein at least one of the entry transition segment and the exit transition segment of the minimum spinal decompression segment is governed by a sigmoid function.

2. The apparatus of claim 1, wherein the decompression actuator is a linear actuator.

3. The apparatus of claim 1, wherein the decompression actuator is a rotary actuator.

4. The apparatus of claim 1, wherein the decompression actuator comprises a servo motor.

5. The apparatus of claim 1, wherein the piecewise logarithmic decompression profile comprises at least two logarithmic portions adjacent to one another.

6. The apparatus of claim 1, wherein the piecewise decompression profile comprises at least one portion having a rising magnitude of decompression over time, and wherein a rate of change of decompression is reduced as the magnitude of decompression approaches a peak value.

7. An apparatus for piecewise spinal decompression therapy comprising:

a therapy bed having a generally-horizontal orientation and a base;

a decompression actuator disposed adjacent to the base of the therapy bed;

a decompression cable secured at a first end to the decompression actuator and at a second end to an attachment ring;

a pelvic harness adapted to be secured about a lumbar region of a patient and attached at a first end to the attachment ring;

a knee support having a generally-prismatic shape, disposed on the therapy bed;

a first amplifier connected to the decompression actuator; and a computer connected to the first amplifier;

wherein the computer is operable to control the first amplifier;

wherein the computer controls the first amplifier according to a piecewise logarithmic decompression profile comprising a logarithmic loading phase and an unloading phase;

wherein the unloading phase comprises an unloading transition segment and a minimum spinal decompressive segment;

wherein the minimum spinal decompressive segment comprises an entry transition segment and an exit transition segment;

wherein the unloading transition segment has a transition duration and the minimum spinal decompressive segment has a duration approximately twice the transition duration; and wherein at least one of the entry transition segment and the exit transition segment of the minimum spinal decompression segment is governed by a sigmoid function.

8. The apparatus of claim 7, wherein the decompression actuator is a linear actuator.

9. The apparatus of claim 7, wherein the decompression actuator is a rotary actuator.

10. The apparatus of claim 7, wherein the decompression actuator comprises a servo motor.

11. The apparatus of claim 7, wherein the piecewise logarithmic decompression profile comprises at least two logarithmic portions adjacent to one another.

12. The apparatus of claim 7, wherein the piecewise decompression profile comprises at least one portion having a rising magnitude of decompression value over time, and wherein a rate of change of decompression is reduced as the magnitude of decompression approaches a peak value.

13. An apparatus for piecewise spinal decompression therapy comprising:

a generally-horizontal therapy bed having a generally-horizontal orientation, a base, an upper surface, a first end and a second end;

a knee support having a u-shaped center channel passing transversely therethrough and having a generally-prismatic shape, disposed on the upper surface of the therapy bed;

a decompression actuator disposed adjacent to the base of the therapy bed;

a decompression cable, passing through the center channel of the knee support, secured at a first end to the decompression actuator and at a second end to an attachment ring;

a pelvic harness adapted to be secured about a lumbar region of a patient and attached at a first end to the attachment ring;

a first amplifier connected to the decompression actuator; and a computer connected to the first amplifier;

wherein the computer is operable to control the first amplifier;

wherein the computer controls the first amplifier according to a piecewise logarithmic decompression profile comprising a logarithmic loading phase and an unloading phase;

wherein the unloading phase comprises an unloading transition segment and a minimum spinal decompressive segment;

wherein the minimum spinal decompressive segment comprises an entry transition segment and an exit transition segment;

wherein the unloading transition segment has a transition duration and the minimum spinal decompressive segment has a duration approximately twice the transition duration; and wherein at least one of the entry transition segment and the exit transition segment of the minimum spinal decompression segment is governed by a sigmoid function.

14. The apparatus of claim 13, wherein the decompression actuator is a linear actuator.

15. The apparatus of claim 13, wherein the decompression actuator is a rotary actuator.

16. The apparatus of claim 13, wherein the decompression actuator comprises a servo motor.

17. The apparatus of claim 13, wherein the piecewise decompression profile comprises at least two logarithmic portions adjacent to one another.

18. The apparatus of claim 13, wherein:

the computer receives feedback from a load cell to correct the output of the first amplifier by a corrective value; and wherein the corrective value is limited according to Stevens' Power Law.

* * * * *